United States Patent
Crumley

(10) Patent No.: US 10,364,569 B2
(45) Date of Patent: *Jul. 30, 2019

(54) GUIDE DEVICE FOR RETAINING TIES IN MASONRY WALLS

(71) Applicant: Harvel K. Crumley, Jacksonville, FL (US)

(72) Inventor: Harvel K. Crumley, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/252,856

(22) Filed: Aug. 31, 2016

(65) Prior Publication Data

US 2016/0369499 A1 Dec. 22, 2016

Related U.S. Application Data

(60) Continuation-in-part of application No. 15/082,640, filed on Mar. 28, 2016, which is a division of
(Continued)

(51) Int. Cl.
*E04B 2/20* (2006.01)
*E04B 1/06* (2006.01)
(Continued)

(52) U.S. Cl.
CPC .................. *E04B 2/20* (2013.01); *E04B 2/16* (2013.01); *E04C 1/39* (2013.01); *E04C 3/22* (2013.01); *E04C 5/08* (2013.01); *E04C 5/125* (2013.01); *E04G 21/12* (2013.01); *E04G 23/0218* (2013.01); *E04H 9/021* (2013.01); *E04H 9/027* (2013.01); *E04H 9/14* (2013.01);
(Continued)

(58) Field of Classification Search
CPC ... E04G 23/0229; E04H 9/027; F16B 31/028; E04C 1/00; E04B 2/20; E04B 2103/02
USPC ..... 52/741.1, 741.14, 741.15, 742.1, 742.13, 52/742.14, 698, 514, 514.5
See application file for complete search history.

(56) References Cited

U.S. PATENT DOCUMENTS

| 599,864 | A | * | 3/1898 | Rapp | ......................... | E04B 2/16 |
| | | | | | | 52/585.1 |
| 919,272 | A | * | 4/1909 | White | ....................... | E04B 2/06 |
| | | | | | | 52/286 |

(Continued)

OTHER PUBLICATIONS

United States Patent and Trademark Office, Office Action for U.S. Appl. No. 15/183,524, dated Aug. 17, 2017.
(Continued)

*Primary Examiner* — Charles A Fox
*Assistant Examiner* — Keith Minter
(74) *Attorney, Agent, or Firm* — Stephen E. Kelly; Hill Ward Henderson, P.A.

(57) ABSTRACT

A retention tie system for pre- or post-construction installation to stabilize masonry or composite walls. The system comprises a tie member anchored in an anchor hole bored into the existing foundation and a tensioned against a base plate and a cover plate seated along the top of the wall. A bracing member is used to provide lateral stability to the respective plate members. A tension washer is used to ensure that the tie members are tensioned to the appropriate load. A guide member is installed within the masonry wall to brace the tie members against lateral deflection.

17 Claims, 18 Drawing Sheets

Related U.S. Application Data application No. 14/603,952, filed on Jan. 23, 2015, now Pat. No. 9,297,176.

(60) Provisional application No. 62/212,200, filed on Aug. 31, 2015, provisional application No. 61/930,819, filed on Jan. 23, 2014.

(51) Int. Cl.

| | | |
|---|---|---|
| E04B 2/84 | (2006.01) | |
| E04B 2/16 | (2006.01) | |
| E04G 21/12 | (2006.01) | |
| E04G 23/02 | (2006.01) | |
| E04C 1/39 | (2006.01) | |
| E04H 9/02 | (2006.01) | |
| E04H 9/14 | (2006.01) | |
| E04C 5/08 | (2006.01) | |
| E04C 5/12 | (2006.01) | |
| F16B 31/02 | (2006.01) | |
| E04C 3/22 | (2006.01) | |
| E04B 2/02 | (2006.01) | |
| E04B 1/04 | (2006.01) | |
| E04B 1/35 | (2006.01) | |

(52) U.S. Cl.
CPC ............ *F16B 31/028* (2013.01); *E04B 1/04* (2013.01); *E04B 2001/3583* (2013.01); *E04B 2002/0254* (2013.01); *Y02A 50/14* (2018.01)

(56) References Cited

U.S. PATENT DOCUMENTS

| | | | | | |
|---|---|---|---|---|---|
| 977,794 | A * | 12/1910 | Griswold | ............... | E04B 1/2608 52/712 |
| 1,069,065 | A * | 7/1913 | Horsfield | ............... | E04B 1/2608 52/684 |
| 1,082,470 | A * | 12/1913 | Phelan | ................... | E04B 1/2608 249/219.1 |
| 1,088,417 | A * | 2/1914 | Harp | ..................... | E04B 1/2608 52/715 |
| 1,146,223 | A * | 7/1915 | Wiswell | ............... | E04B 1/2608 52/715 |
| 1,146,251 | A * | 7/1915 | Harp | ..................... | E04B 1/2608 52/289 |
| 1,257,276 | A * | 2/1918 | Wiswell | ............... | E04B 1/2608 52/715 |
| 1,320,259 | A * | 10/1919 | Martens | .................. | F16B 39/24 238/349 |
| 1,753,451 | A * | 4/1930 | Tonnelier | ................. | E04B 2/30 52/223.7 |
| 1,963,535 | A * | 6/1934 | Trotter | .................... | F16B 39/24 411/149 |
| 2,241,169 | A * | 5/1941 | Yokes | ...................... | E04B 1/12 52/223.7 |
| 2,369,687 | A * | 2/1945 | Ralston | .................. | E04B 1/2608 296/30 |
| 2,627,176 | A * | 2/1953 | Levy | ........................ | E04B 2/42 52/223.7 |
| 2,635,451 | A * | 4/1953 | Walthers | ................... | E04B 2/44 52/223.7 |
| 2,850,937 | A * | 9/1958 | Ralston | ................... | E21D 21/02 116/DIG. 34 |
| 3,036,407 | A * | 5/1962 | Dixon | ..................... | E04B 2/10 52/439 |
| 3,037,221 | A * | 6/1962 | Lanius, Jr. | ............. | B23P 19/08 29/511 |
| 3,109,260 | A * | 11/1963 | De Cesare | ................ | E04B 1/41 52/300 |
| 3,141,182 | A * | 7/1964 | Lanius, Jr. | ............... | B21K 1/64 29/512 |
| 3,150,557 | A * | 9/1964 | Brown | ............... | E21D 21/0086 411/9 |
| 3,190,333 | A * | 6/1965 | Lanius, Jr. | ............... | F16B 39/24 411/134 |
| 3,256,030 | A * | 6/1966 | Banse | .................. | E04B 1/2608 248/300 |
| 3,296,758 | A * | 1/1967 | Knudsen | .................. | E04B 2/10 52/223.7 |
| 3,323,403 | A * | 6/1967 | Waisman | ............... | F16B 31/028 411/10 |
| 3,352,344 | A * | 11/1967 | Lanius, Jr. | ............... | F16B 39/24 411/145 |
| 3,378,965 | A * | 4/1968 | Broquist | .................. | E04C 3/44 52/223.7 |
| 3,382,632 | A * | 5/1968 | Grofcsik | .................. | E04B 2/10 52/223.7 |
| 3,434,520 | A * | 3/1969 | Bedford, Jr. | ............. | F16B 39/24 411/134 |
| 3,474,701 | A * | 10/1969 | Setzler | .................. | F16B 31/028 411/8 |
| 3,593,532 | A * | 7/1971 | Grazel | .................... | E02D 5/523 29/897.34 |
| 3,605,361 | A * | 9/1971 | Howlett et al. | ......... | E04C 5/122 24/122.6 |
| 3,609,926 | A * | 10/1971 | Muse | ....................... | E04B 2/44 52/439 |
| 3,618,279 | A * | 11/1971 | Sease | ...................... | E04B 2/46 52/223.7 |
| 3,813,835 | A * | 6/1974 | Rice | .................... | E04B 1/34823 52/223.7 |
| 4,012,915 | A * | 3/1977 | Poma | ....................... | E02D 5/72 405/243 |
| 4,020,734 | A * | 5/1977 | Bell | ..................... | F16B 31/028 411/10 |
| 4,072,081 | A * | 2/1978 | Curtis | .................. | F16B 31/028 411/10 |
| 4,077,599 | A * | 3/1978 | Oland | ...................... | B28B 7/28 249/177 |
| 4,149,446 | A * | 4/1979 | Spengler | ............... | F16B 31/028 411/11 |
| 4,292,876 | A * | 10/1981 | De Graan | ............ | F16B 43/001 411/369 |
| 4,347,024 | A * | 8/1982 | Coldren | ................ | F16B 31/028 411/11 |
| 4,409,764 | A * | 10/1983 | Wilnau | .................. | E04B 1/165 52/127.3 |
| 4,410,294 | A * | 10/1983 | Gilb | ....................... | E04B 1/2612 403/232.1 |
| 4,478,517 | A * | 10/1984 | Hoppe | .................... | B01F 5/243 222/459 |
| 4,510,170 | A * | 4/1985 | Cosentino | ............... | B05B 5/081 118/303 |
| 4,572,695 | A * | 2/1986 | Gilb | ....................... | E04B 1/2608 248/300 |
| 4,674,255 | A * | 6/1987 | Derome | ............... | E04G 17/0644 249/210 |
| 4,703,602 | A * | 11/1987 | Pardo | .................. | E02D 29/0241 52/223.7 |
| 4,714,372 | A * | 12/1987 | Commins | ............... | E04B 1/2608 403/346 |
| 4,715,297 | A * | 12/1987 | Lichter | ..................... | E05G 1/00 109/50 |
| 4,726,567 | A * | 2/1988 | Greenberg | ................ | E04B 2/16 256/19 |
| 4,750,306 | A * | 6/1988 | Granieri | ................. | E02D 27/50 52/251 |
| 4,757,656 | A * | 7/1988 | Powers, Jr. | ............... | E04C 3/02 52/204.2 |
| 4,773,198 | A * | 9/1988 | Reinhardt | ............... | E04C 5/122 52/223.13 |
| 4,821,483 | A * | 4/1989 | Adams | ...................... | B28B 1/08 264/333 |
| 4,824,290 | A * | 4/1989 | Masoudi | .................. | E02D 27/30 249/10 |
| 4,848,052 | A * | 7/1989 | Nutzel | .................... | E01D 11/04 52/223.13 |
| 4,872,823 | A * | 10/1989 | Howard | ................ | B28B 7/0088 264/33 |

(56) References Cited

U.S. PATENT DOCUMENTS

| | | | | |
|---|---|---|---|---|
| 4,889,457 A * | 12/1989 | Hageman | F16B 31/028 | 411/10 |
| 4,904,122 A * | 2/1990 | Herbst | E21D 21/0033 | 405/259.1 |
| 4,988,246 A * | 1/1991 | Yoshida | F16B 31/028 | 116/DIG. 34 |
| 5,007,218 A * | 4/1991 | Bengtson | E04B 1/06 | 52/204.1 |
| 5,063,723 A * | 11/1991 | Yoder | E04C 1/39 | 52/306 |
| 5,109,646 A * | 5/1992 | Colonias | E04B 1/2608 | 248/300 |
| 5,138,808 A * | 8/1992 | Bengtson | E04B 1/06 | 52/204.2 |
| 5,188,494 A * | 2/1993 | Hatin | F16B 31/028 | 411/10 |
| 5,199,835 A * | 4/1993 | Turner | F16B 31/028 | 116/212 |
| 5,280,967 A * | 1/1994 | Varrin, Jr. | F16B 31/028 | 285/382.7 |
| 5,311,708 A * | 5/1994 | Frye | E04B 7/04 | 52/90.1 |
| 5,335,469 A * | 8/1994 | Stuart | E04B 1/2608 | 403/232.1 |
| 5,355,647 A * | 10/1994 | Johnson | E04C 1/41 | 52/223.5 |
| 5,385,054 A * | 1/1995 | Kramer | F16B 31/028 | 411/10 |
| 5,410,850 A * | 5/1995 | Dreizler | E04C 5/161 | 428/150 |
| 5,503,088 A * | 4/1996 | Hayman | E05G 1/024 | 109/50 |
| 5,546,723 A * | 8/1996 | Jones | E04B 1/0007 | 411/163 |
| 5,556,234 A * | 9/1996 | Oldsen | F16B 31/028 | 405/259.1 |
| 5,570,549 A * | 11/1996 | Lung | E04C 5/125 | 403/306 |
| 5,596,857 A * | 1/1997 | Besche | E04B 2/48 | 52/100 |
| 5,596,859 A * | 1/1997 | Horton | E04B 2/7453 | 52/481.1 |
| 5,678,373 A * | 10/1997 | Franklin | E04B 2/14 | 52/223.7 |
| 5,722,807 A * | 3/1998 | Hodge | F16B 31/028 | 411/10 |
| 5,782,048 A * | 7/1998 | Ramirez | E04H 9/14 | 52/295 |
| 5,794,921 A * | 8/1998 | Greenberg | E04H 17/1404 | 256/19 |
| 5,845,444 A * | 12/1998 | Besche | E04B 2/48 | 52/421 |
| 5,864,999 A * | 2/1999 | Wallin | E02D 29/02 | 52/250 |
| 5,878,544 A * | 3/1999 | McKinnon | E04B 2/8629 | 52/293.2 |
| 5,885,034 A * | 3/1999 | Fergusson | E21D 21/008 | 405/302.1 |
| 5,890,332 A * | 4/1999 | Skidmore | E04B 2/08 | 52/271 |
| 5,907,939 A * | 6/1999 | Reichel | E04B 2/8629 | 52/431 |
| 5,927,918 A * | 7/1999 | Burger | B60D 1/06 | 280/513 |
| 5,937,604 A * | 8/1999 | Bowron | E04G 17/0721 | 248/229.16 |
| 6,014,843 A * | 1/2000 | Crumley | E04H 9/02 | 403/300 |
| 6,061,986 A * | 5/2000 | Canada | E04B 1/3555 | 52/293.3 |
| 6,079,176 A * | 6/2000 | Westra | E04G 9/10 | 249/15 |
| 6,082,063 A * | 7/2000 | Shrive | E04C 5/122 | 52/223.13 |
| 6,085,476 A * | 7/2000 | Jantzi | E04B 2/84 | 52/223.7 |
| 6,098,357 A * | 8/2000 | Franklin | E04B 2/14 | 52/223.7 |
| 6,161,339 A * | 12/2000 | Cornett, Sr. | E04B 7/02 | 52/23 |
| 6,178,714 B1 * | 1/2001 | Carney, Jr. | E04B 1/34315 | 52/223.7 |
| 6,195,955 B1 * | 3/2001 | Kostopoulos | E04B 2/26 | 52/583.1 |
| 6,230,644 B1 * | 5/2001 | Passen | B63B 3/06 | 114/263 |
| 6,282,859 B1 * | 9/2001 | Van Der Heijden | E04B 2/08 | 52/585.1 |
| 6,295,781 B1 * | 10/2001 | Thompson | E04B 1/2608 | 403/232.1 |
| 6,367,205 B2 * | 4/2002 | Cornett, Sr. | E04B 7/02 | 52/223.13 |
| 6,418,695 B1 * | 7/2002 | Daudet | E04B 7/022 | 52/639 |
| 6,431,797 B2 * | 8/2002 | Greenberg | 405/262 |
| 6,560,943 B1 * | 5/2003 | Leek | E04B 7/045 | 52/295 |
| 6,662,517 B1 * | 12/2003 | Thompson | E04H 9/14 | 52/712 |
| 6,758,020 B2 * | 7/2004 | Cerrato | E04B 1/703 | 52/223.7 |
| 6,799,407 B2 * | 10/2004 | Saldana | E04B 1/2403 | 52/655.1 |
| 6,996,945 B2 * | 2/2006 | Doty | E04B 2/18 | 52/582.1 |
| 7,117,647 B2 * | 10/2006 | Clarke | E04B 2/702 | 403/192 |
| 7,150,132 B2 * | 12/2006 | Commins | E04B 1/26 | 411/536 |
| 7,328,535 B1 * | 2/2008 | Correia | E02D 29/025 | 405/284 |
| 7,448,178 B2 * | 11/2008 | Visone | E04B 1/2612 | 428/582 |
| 7,779,589 B2 * | 8/2010 | Salman | E04B 1/4114 | 248/156 |
| 8,225,578 B2 * | 7/2012 | Azizi Ronagh | E04B 2/16 | 52/285.2 |
| 8,281,528 B2 * | 10/2012 | Clarke | E04B 2/702 | 52/223.14 |
| 8,375,671 B1 * | 2/2013 | Thrasher | E02D 31/002 | 405/262 |
| 8,382,409 B2 * | 2/2013 | Wallace | G01L 5/243 | 411/13 |
| 8,458,973 B1 * | 6/2013 | Powers, Jr. | E04C 3/20 | 249/19 |
| 8,894,328 B2 | 11/2014 | Zeitler et al. | | |
| 8,898,990 B2 * | 12/2014 | Drew | E04B 2/16 | 52/600 |
| 8,931,223 B2 * | 1/2015 | Speer | E04B 2/16 | 52/223.7 |
| 8,955,282 B2 * | 2/2015 | Yap Ching | E04B 2/16 | 52/396.06 |
| 8,959,863 B2 * | 2/2015 | Gray | E04G 23/0285 | 52/169.5 |
| 8,973,322 B2 * | 3/2015 | Heron | E04C 5/08 | 52/223.7 |
| 9,175,469 B2 * | 11/2015 | Toopchinezhad | B28B 7/183 | |
| 9,316,009 B2 * | 4/2016 | Gray | E04G 23/0288 | |
| 9,604,416 B2 * | 3/2017 | Sorkin | B28B 7/28 | |
| 2001/0002524 A1 * | 6/2001 | Espinosa | E04C 5/08 | 52/293.3 |
| 2002/0014050 A1 * | 2/2002 | Van Der Heijden | E04B 2/08 | 52/585.1 |
| 2002/0041796 A1 * | 4/2002 | Greenberg | E02D 29/0283 | 405/284 |
| 2003/0200716 A1 * | 10/2003 | Manthei | E04B 2/06 | 52/565 |

(56) References Cited

U.S. PATENT DOCUMENTS

| | | | |
|---|---|---|---|
| 2003/0233798 A1* | 12/2003 | Berkey | E04C 5/08 52/223.7 |
| 2004/0020144 A1* | 2/2004 | Sanders | E04C 5/08 52/223.7 |
| 2004/0020145 A1* | 2/2004 | Matsufuji | E04B 2/42 52/223.7 |
| 2004/0074171 A1* | 4/2004 | Wobben | E04C 3/22 52/223.1 |
| 2004/0079034 A1* | 4/2004 | Leek | E04B 7/045 52/92.2 |
| 2004/0093824 A1* | 5/2004 | Huber | E02D 27/02 52/834 |
| 2005/0081465 A1* | 4/2005 | Crumley | E04H 9/14 52/223.1 |
| 2005/0252118 A1* | 11/2005 | Matsufuji | E04B 2/02 52/223.7 |
| 2005/0257459 A1* | 11/2005 | Schieffer | B25B 9/00 52/223.7 |
| 2006/0033003 A1* | 2/2006 | Watson | B28B 7/28 249/177 |
| 2006/0201082 A1* | 9/2006 | Hammer | E04C 1/395 52/223.5 |
| 2006/0272245 A1* | 12/2006 | Matsufuji | E04B 2/16 52/223.7 |
| 2007/0056235 A1* | 3/2007 | Kohler | E04C 2/041 52/223.7 |
| 2007/0107333 A1* | 5/2007 | Marsh | E02D 29/025 52/223.7 |
| 2007/0245659 A1* | 10/2007 | West | B28B 7/0041 52/426 |
| 2007/0289239 A1* | 12/2007 | Lee | E02D 31/02 52/426 |
| 2008/0111049 A1* | 5/2008 | Huber | B28B 23/024 249/18 |
| 2008/0149808 A1* | 6/2008 | Malone | E04B 1/3505 249/137 |
| 2008/0178545 A1* | 7/2008 | Finkelshteyn | E04G 23/02 52/294 |
| 2008/0179472 A1* | 7/2008 | Miller | E04H 12/12 248/200 |
| 2008/0184988 A1* | 8/2008 | Mullin | F24B 1/18 126/500 |
| 2008/0244993 A1* | 10/2008 | Crumley | E04B 7/045 52/92.2 |
| 2009/0084056 A1* | 4/2009 | Robertson | E04B 1/2604 52/396.05 |
| 2009/0094916 A1* | 4/2009 | Crumley | E04H 9/14 52/293.3 |
| 2009/0107082 A1* | 4/2009 | Commins | E04B 1/2604 52/745.21 |
| 2009/0313923 A1* | 12/2009 | Bucheger | E04B 2/44 52/223.7 |
| 2010/0115866 A1* | 5/2010 | Espinosa | E04B 1/2604 52/262 |
| 2012/0180412 A1* | 7/2012 | Secrest | E02D 29/00 52/222 |
| 2012/0297701 A1* | 11/2012 | Oakley | E04G 9/021 52/127.3 |
| 2012/0305125 A1* | 12/2012 | Nirmel | B67C 11/02 141/1 |
| 2013/0008114 A1* | 1/2013 | Simon-Dominguez | E04G 11/44 52/414 |
| 2013/0081343 A1* | 4/2013 | Chadwick | E04B 2/702 52/223.14 |
| 2014/0196392 A1* | 7/2014 | Heron | E04B 2/40 52/293.2 |
| 2014/0202111 A1* | 7/2014 | Drew | E04B 2/16 52/589.1 |
| 2015/0204092 A1* | 7/2015 | Crumley | E04G 23/0229 52/514 |
| 2016/0369499 A1* | 12/2016 | Crumley | E04B 2/16 |

OTHER PUBLICATIONS

United States Patent and Trademark Office, Office Action for U.S. Appl. No. 15/183,524, dated Apr. 30, 2018.

* cited by examiner

GUIDE DEVICE FOR RETAINING TIES IN MASONRY WALLS

CROSS-REFERENCE TO RELATED APPLICATION

Pursuant to 35 U.S.C. §§ 119(e) and 120, this application:
(i) is a continuation-in-part application of U.S. patent application Ser. No. 15/082,640, filed on Mar. 28, 2016, which is a divisional of U.S. patent application Ser. No. 14/603,952, filed on Jan. 23, 2015, now U.S. Pat. No. 9,297,176, which claimed the benefit of U.S. Provisional Patent Application No. 61/930,819, filed on Jan. 23, 2014; and
(ii) claims the benefit of U.S. Provisional Patent Application Ser. No. 62/212,200, filed on Aug. 31, 2015,
the entire contents of each of which are incorporated herein by this reference.

BACKGROUND

1. Field of Invention

This invention relates generally to masonry structures, and more particularly, to reinforcement and retrofitting of masonry or foam core structures exposed to extreme wind and/or seismic loading events.

2. Description of Related Art

Masonry structures are common in residential and light commercial construction. In the case of masonry construction, the structure should be protected from uplift, shear, and overturning forces developed by wind or seismic activity. In the United States, the amount of wind and seismic activity differs with geographical location, which is shown by differences in local building codes throughout the country. In many structures, reinforcing concrete masonry unit (CMU) walls resists these forces. In new construction, this is accomplished by filling vertical cells of the masonry wall with concrete and steel reinforcing bars at a given spacing. The number of reinforced cells and the strength of concrete and steel used will vary depending on the severity of the wind and/or seismic conditions in the locality of the structure, and the structure's geometry.

In many instances, the steel reinforcing is installed during the foundation and masonry installation. Steel anchor bars are installed into the foundation footings as required by the loads and extends upward beyond the footings approximately two to three feet. The CMUs are then installed over the steel bars so that the steel bars are in the center of the cell (or void within the masonry unit). After the CMU wall is constructed, additional steel that extends from the foundation to the top of the wall is installed. Next, concrete is poured into the cell around the steel bars.

Flexible steel tie members can be used instead of steel bars. These steel tie members span from the foundation to the top of the CMU wall, and they typically take the form of steel strands or steel cable. It can be difficult to insert the flexible tie members after wall construction since the natural coil in the tie member is not conducive to threading through narrow vertical voids in the wall. The free end of flexible tie members tends to become snagged or entangled during the installation process, making use of flexible steel tie members difficult or impossible.

Therefore, what is needed is a guide member installed within vertical passageways in the wall to assist in installing the flexible tie members inside the wall.

SUMMARY OF THE PREFERRED EMBODIMENTS

The present system and apparatus provides masonry structures adequate resistance to uplift, shear, and overturning forces caused by wind and/or seismic loading events. The force resistance is accomplished by installing tension tie members at spacing required by the wind and/or seismic loads present. A continuous tension load path is developed from the top of the exterior load bearing masonry wall to the foundation by using a tension member, such as a wire rope.

The retaining tie system is installed by locating access blocks that correspond to the anchor points identified by structural analysis and installing a knock-out in the side of each of the access blocks. The knock-out enables access to the top of the foundation, and an anchor hole is drilled into the top surface of the foundation. The anchor hole is then covered with a protective member to prevent intrusion of unwanted debris.

At the top of the CMU wall, an elongated base plate is seated across the top of the CMU blocks. An elongated cover plate is then placed over the base plate. An access hole is then installed through the base plate and the cover plate at each location where a tie member is to be installed. Once the access holes are placed in proper vertical alignment with the anchor holes, a bearing plate member is placed above each of the access holes. An anchor end of the tie member is then inserted through a hole in the bearing plate member. The anchor end is lowered through the vertical passageway until it is located in close proximity to the anchor hole, while the tension end remains protruding from the bearing plate member. The anchor end is then inserted into the anchor hole, and once the anchor end is properly seated inside the anchor hole, a retaining material is inserted into the anchor hole around the anchor end. The retaining material is an epoxy, grout, resin, or other such material configured to form a bond between the anchor end and the concrete of the foundation.

Once the retaining material has cured, the tension end is then tensioned to the desired tension force. In one embodiment, the tension end is tensioned by using a mechanical tensioner, such as a threaded fastener or coupler that is securely attached to the tie member. This tension force is carried by the tie member and is resisted by the reaction force of the anchor end that is securely embedded into the anchor hole. This tension force in the tie member places the CMU wall in compression, thereby stabilizing the CMU wall against lateral forces and bending moments. The tie members are any member capable of delivering the tension force needed to retain the CMU wall in compression for the design life of the tie system.

Another embodiment of the retaining tie system comprises a bracing member located in the vertical passageway. The bracing member is one of a variety of materials, such as cured in place foam, pre-cured foam, wood, grout, a bracket, or other such member. In one embodiment, the bracing member is a cured in place foam that is sprayed into the vertical passageway. In another embodiment, the bracing member is a funnel-shaped guide that is installed within the masonry wall to brace the tie members against lateral deflection.

Another embodiment of the retaining tie system comprises a tension washer installed above the bearing plate member. The tension washer has a body portion defining a central bolt opening, and an annular flange member depending from the body and having a slightly curved outer rim. The top surface of the tension washer is a different color than the edge and bottom surface of the washer. The rim and the bottom surface could be the same color or different colors. A threaded fastener, such as the mechanical tensioner, is passed through the opening of the tension washer and tensioned by a socket or wrench applying torque to a nut or bolt head. As the threaded fastener is tensioned, the flange member is compressed against the bearing plate member, thereby causing the curved outer rim to curl upward toward the socket and away from the bearing plate member. This rim curling action continues until the color of the edge or the bottom surface becomes visibile, thereby providing a visual indicator that the requisite tension level has been achieved in the fastener or mechanical tensioner.

In another embodiment of the retention tie system, the system is used in connection with insulated concrete panel walls or other composite wall members. Composite wall members typically comprise a foam core and a protective cover layer that may or may not contribute to the structural properties of the overall panel wall member. In this embodiment, the tie members are installed as described above. In some embodiments of wall members, the foam core has vertical voids that serve as the vertical passageway. In other embodiments, the vertical passageway must be installed prior to placement of the tie members.

DETAILED DESCRIPTION OF THE PREFERRED EMBODIMENTS

With reference to the drawings, the preferred embodiments will now be described with regard for the best mode. In general, the system and apparatus disclosed herein is a retaining tie system intended for pre- or post-construction reinforcement of masonry walls and a method for installing the same. The embodiments disclosed herein are meant for illustration and not limitation of the invention. An ordinary practitioner will appreciate that it is possible to create many variations of the following embodiments without undue experimentation.

The retaining tie system disclosed herein is intended to be installed either during or after construction of the foundation and masonry wall. The present retaining tie system could be installed in a late stage of the initial construction, or it could be installed as a retrofit to an existing building. Before installing the retaining tie system, a structural analysis is performed to determine the design loads caused by a dynamic loading event, such as the forces caused by wind or seismic events that are typical for the geographic location where the structure is located. Based on these design loads identified in the structural analysis, the structure is analyzed to determine the number, size, and anchor point locations of tie members 15 needed for the retaining tie system to operate correctly. Based on the number of needed tie members 15 and the geometry of the foundation 5 of the structure, the required spacing of the tie members 15 is determined. This spacing is the linear spacing between the tie members 15 along the concrete masonry unit (CMU) wall 10 that is required to evenly distribute along the CMU wall 10 the uplift forces caused by a dynamic loading event. Based on this spacing, the user determines the anchor points where the tie members 15 will be installed, as discussed below. That is, the nodes of the spacing pattern along the CMU wall 10 substantially coincide with the anchor points for the tie members 15.

Figure 1:
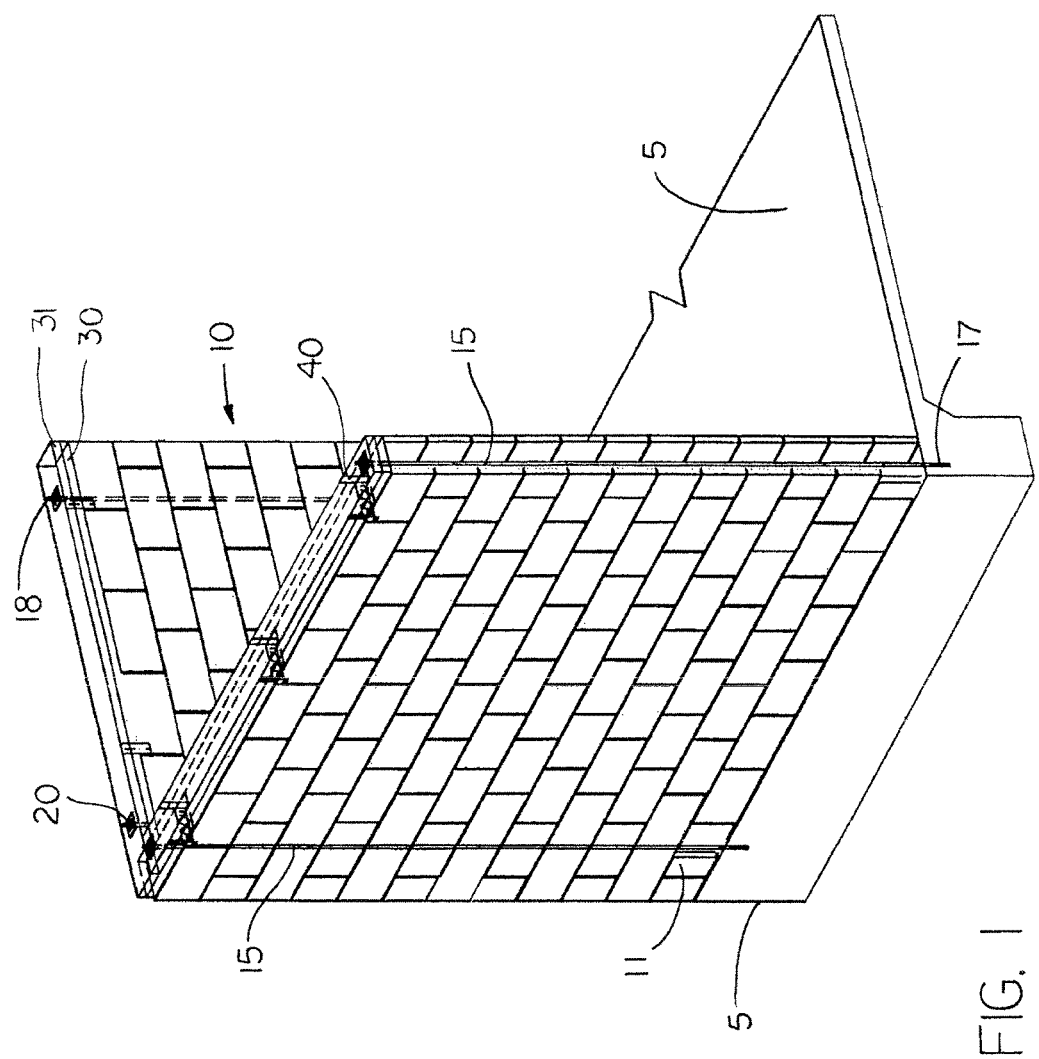
FIG. 1 is an isometric view of a portion of a typical concrete masonry unit wall retrofitted with the present retaining tie system.
Figure 2:
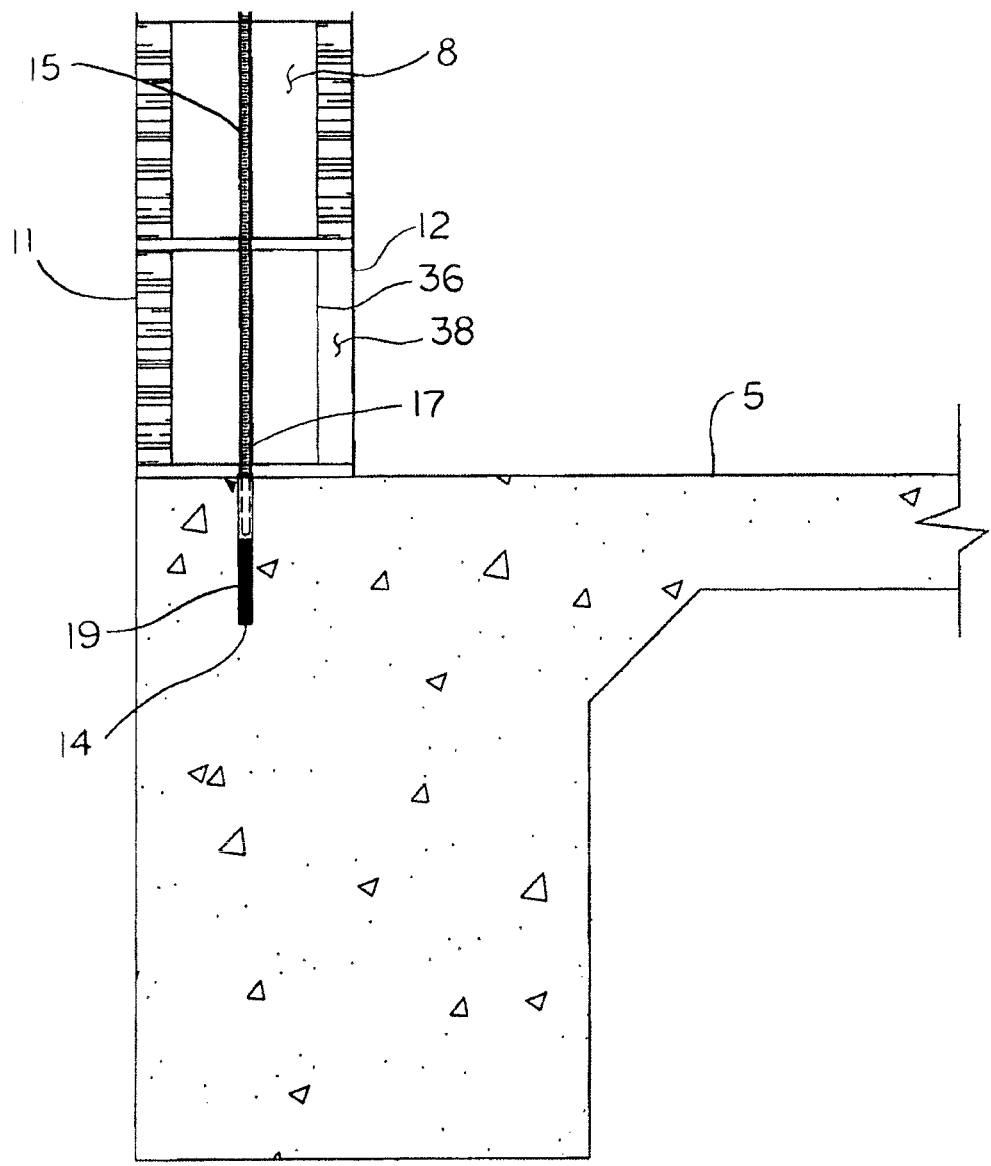
FIG. 2 is a partial cross section of a foundation interface with a CMU wall showing a typical tie member anchorage in the present retaining tie system.

Referring to FIGS. 1 and 2, a structure has a foundation 5 and a CMU wall 10. The foundation 5 is typically a steel reinforced concrete slab either with or without footers. The retaining tie system is installed by locating access blocks 11 that correspond to the anchor points identified by structural analysis. The access blocks 11 are blocks in the CMU wall 10 that coincide most closely with the anchor points determined in the structural analysis. Once the access blocks 11 are identified, a knock-out 12 is installed in the side of each of the access blocks 11. The knock-out 12 enables access to the top of the foundation 5, and an anchor hole 14 is drilled into the top surface of the foundation 5. The anchor hole 14 is then covered with a protective member, such as tape or a removable plug, to prevent intrusion of unwanted debris.

Figure 3:
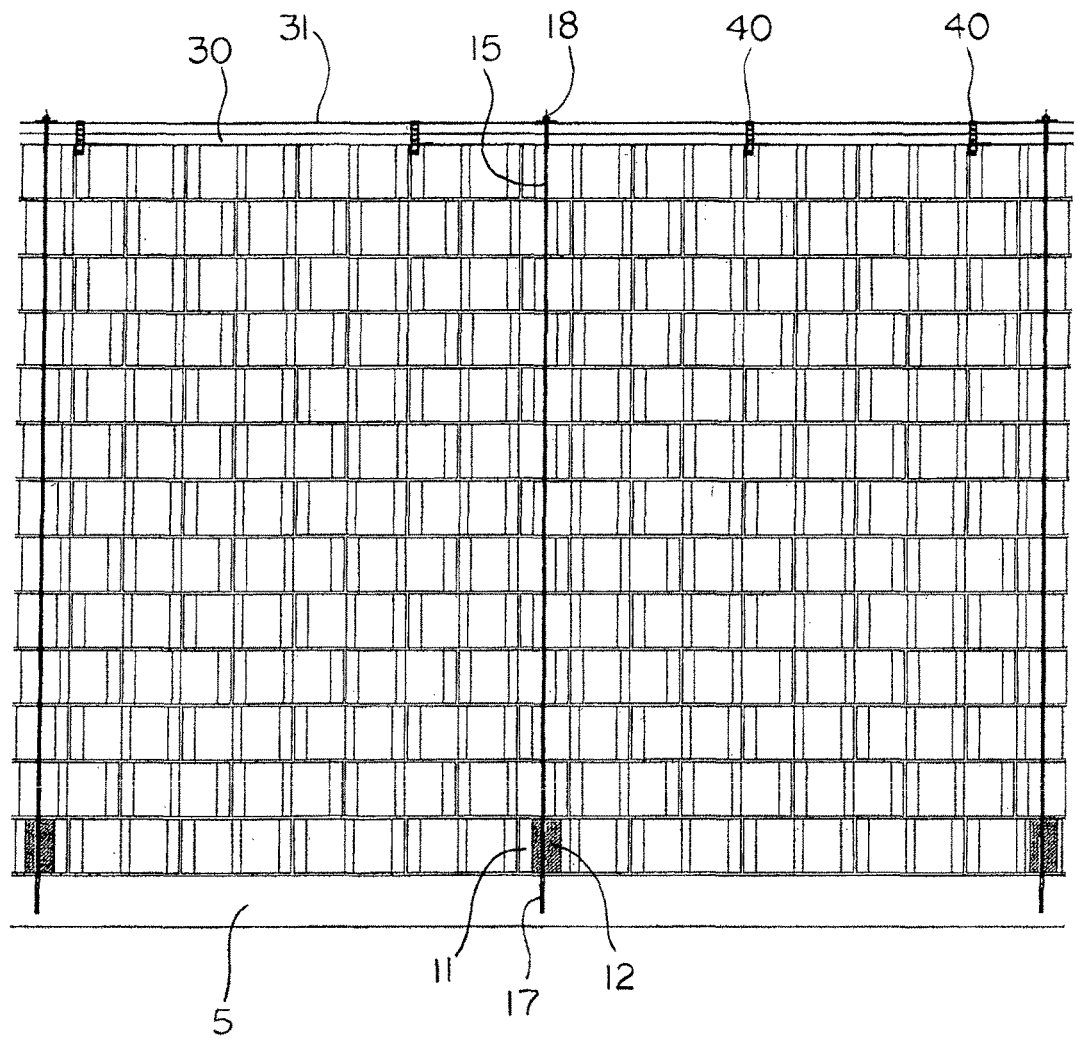
FIG. 3 is a partial cross section view of a CMU wall having the retaining tie system installed.
Figure 4:
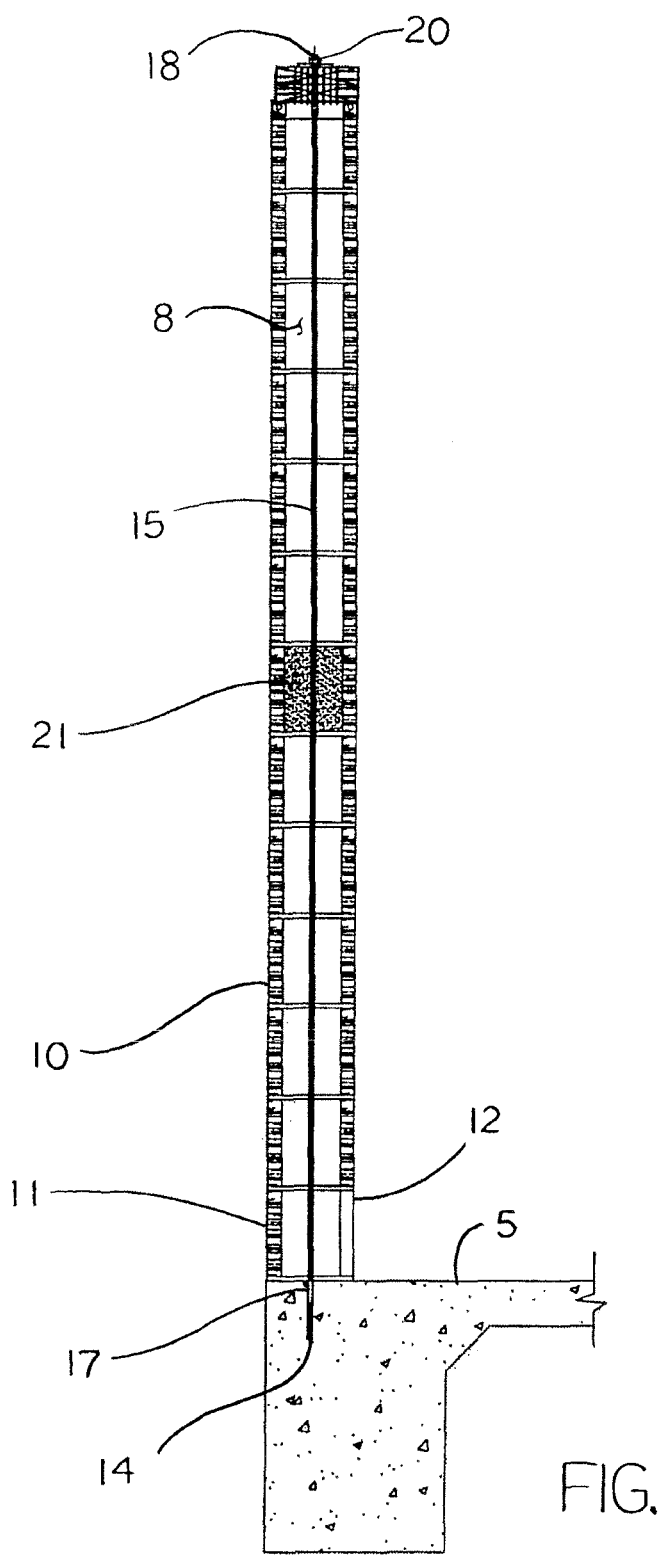
FIG. 4 is a cross section of a CMU wall having the retaining tie system installed.
Figure 5:
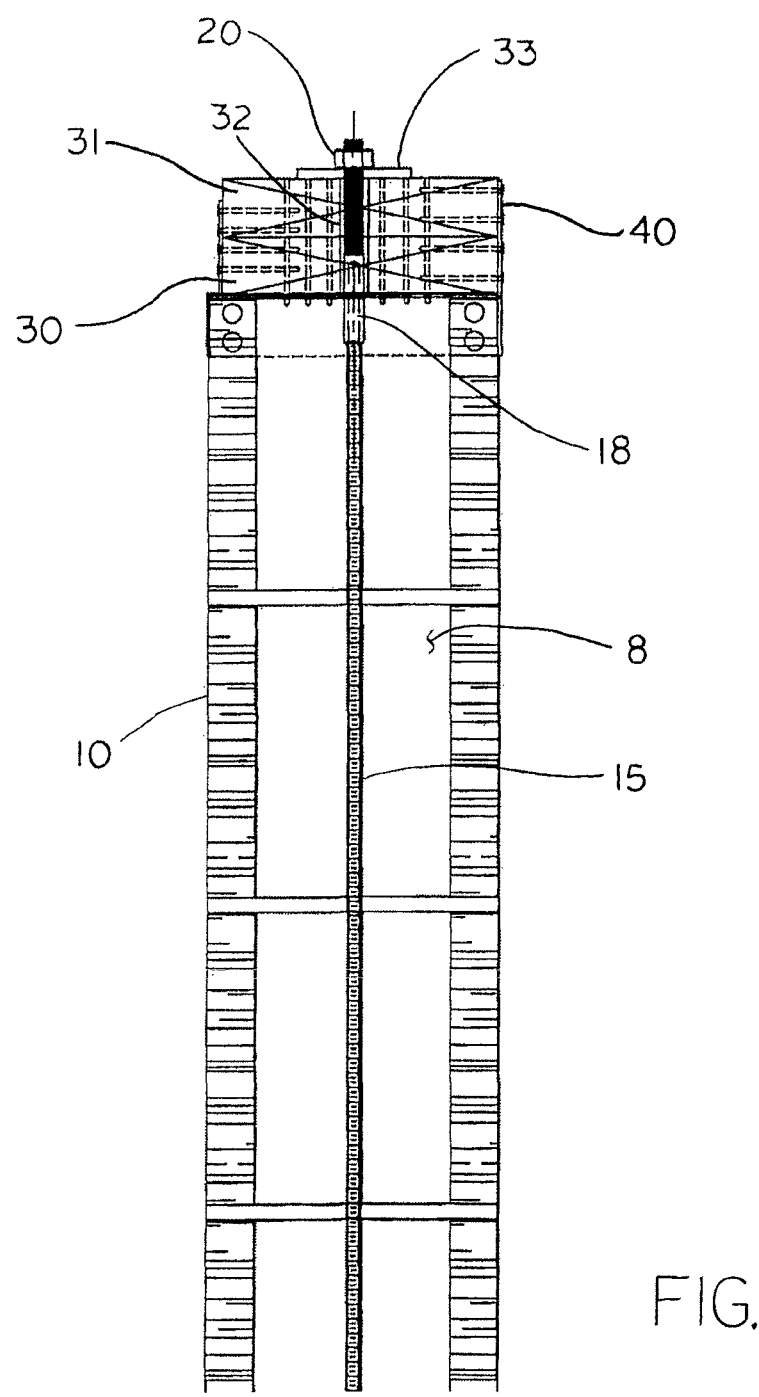
FIG. 5 is a cross section showing the anchorage of the tie member at the top of the CMU wall.

At the top of the CMU wall 10, an elongated base plate 30 is seated across the top of the CMU blocks (shown in FIGS. 3-5). An elongated cover plate 31 is then placed over the base plate 30. An access hole 32 (FIG. 5) is then installed through the base plate 30 and the cover plate 31 at each location where a tie member 15 is to be installed. Alternately, the respective plate members 30, 31 could be pre-drilled with the access holes 32 before the plates are seated on the CMU wall 10. Once the plate members 30, 31 are properly seated, the access holes 32 are placed in substantial vertical alignment with the anchor holes 14 such that the installed tie member 15 passes through a substantially direct vertical passageway 8 from the anchor hole 14 to the access hole 32 with minimal disruption or interference. An ordinary practitioner will appreciate that the vertical passageway 8 in this embodiment is the vertically aligned voids in the individual blocks in the CMU wall 10.

The plates 30, 31 are members providing enough rigidity to distribute the compressive force caused by the tie members 15 across the top of the CMU wall 10. The plates 30, 31 could be wood, composite, polycarbonate, metal, or other material. In one embodiment the base plate 30 is pressure treated wood, and the cover plate 31 is wood. As used herein, "substantial vertical alignment" means a vertical alignment that permits installation of the tie member 15 without debilitating interference from vertically misaligned members or components.

Once the access holes 32 are placed in proper vertical alignment with the anchor holes 14, an optional bearing plate member 33 (FIG. 5) is placed above each of the access holes 32. The bearing pate member 33 has a receiving hole that is placed in substantial vertical alignment with the access hole 32 such that the tie member 15 is able to pass through the bearing plate member 33 and into the access holes 32 as described below. The purpose of the bearing plate member 32 is to distribute along the cover plate 31 the compressive force caused by a properly installed tie member 15. The bearing plate member 33 should be rigid enough to laterally distribute the compressive force applied to the cover plate 31. In one embodiment, the bearing plate member 33 is metal, such as steel, and the cover plate 31 is wood.

Referring again to FIGS. 1 and 2, after placement of the bearing plate member 33, an anchor end 17 of the tie member 15 is inserted through the hole in the bearing plate member 33. The anchor end 17 is lowered through the vertical passageway 8 until it is located in close proximity to the anchor hole 14, while the tension end 18 remains protruding from the bearing plate member 33. The anchor hole 14 is accessed through the knock-out 12, and the protective member is removed from the anchor hole 14. The anchor end 17 is then inserted into the anchor hole 12, and once the anchor end 17 is properly seated inside the anchor hole 14, a retaining material 19 is inserted into the anchor hole 14 around the anchor end 17. The retaining material 19 is an epoxy, grout, resin, or other such material configured to form a bond between the anchor end 17 and the concrete of the foundation 5. Alternately, the retaining material 19 could be inserted into the anchor hole 14, or applied directly to the anchor end 17, before the anchor end 17 is inserted. The anchor hole 14 should be pre-drilled deeply enough to enable insertion of the anchor end 17 of the tie member 15 to a length that allows for the retaining material 19 to fully bond to the anchor end 17 and the concrete of the foundation 5. The length of the bond between the anchor end 17 and the retaining material 18 should be long enough to develop the full tensile strength of the tie member 15. The retaining material 19 should be allowed ample time to cure, as required. Alternate types of anchor devices could be used to secure the anchor end 17 inside the anchor hole 14, such as threaded concrete anchors.

Once the retaining material 19 has cured, the tension end 18 is then tensioned to the desired tension force. In one embodiment, the tension end 18 is tensioned by using a mechanical tensioner 20, such as a threaded fastener or coupler that is securely attached to the tie member 15. This tension force is carried by the tie member 15 and is resisted by the reaction force of the anchor end 17 securely embedded into the anchor hole 14. This tension force in the tie member 15 places the CMU wall 10 in compression, thereby stabilizing the CMU wall against lateral forces and bending moments.

The tie members 15 are any member capable of delivering the tension force needed to retain the CMU wall 10 in compression for the design life of the tie system. The tie members 15 could be rods, cables, strands, wire rope, or other material.

In one embodiment of the retaining tie system, after the appropriate tension force is applied to the tie member 15, a screen member 36 is placed over the knock-out 12 and a fill material is used to cover the screen member 36. The fill material 38 could be drywall, stucco, or other such material that enables the user to conceal the existence of the knock-out 12. One embodiment of the fill material 38 comprises a waterproofing material to protect the tie member 15 from corrosion caused by water leaking through the fill material 38.

Figure 6:
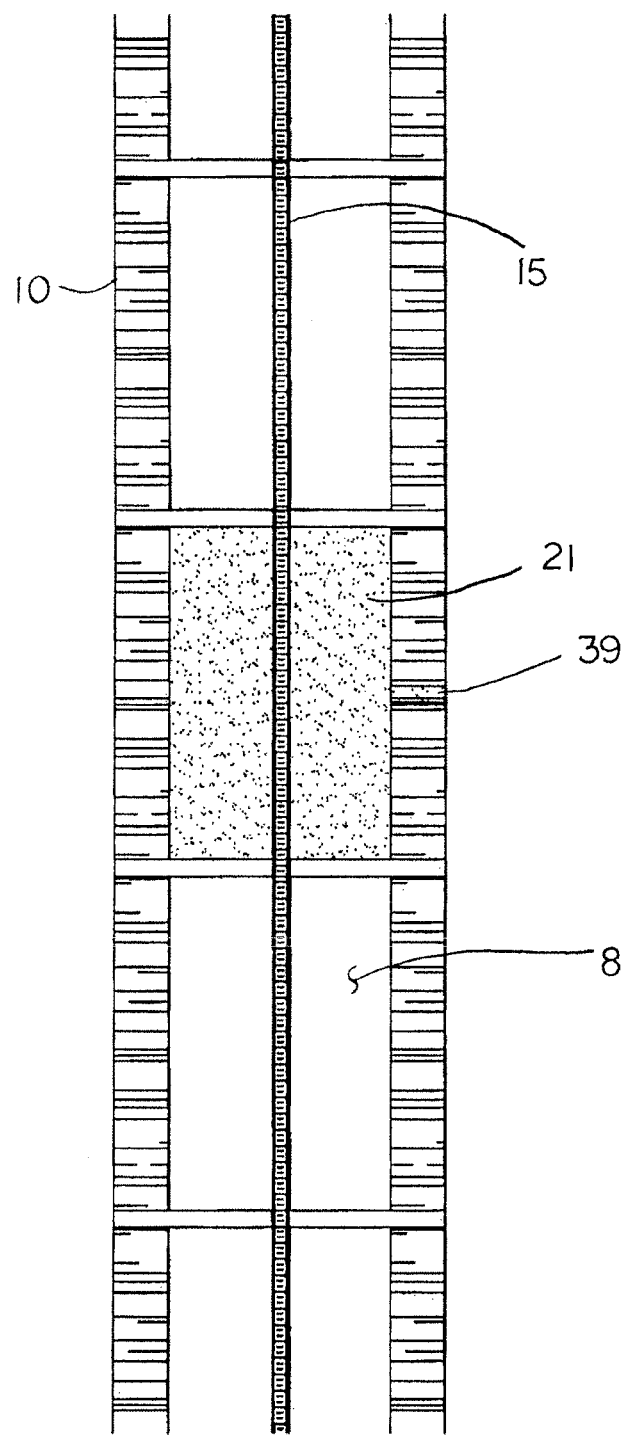
FIG. 6 is a cross section of a CMU wall showing the bracing member.
Figure 7:
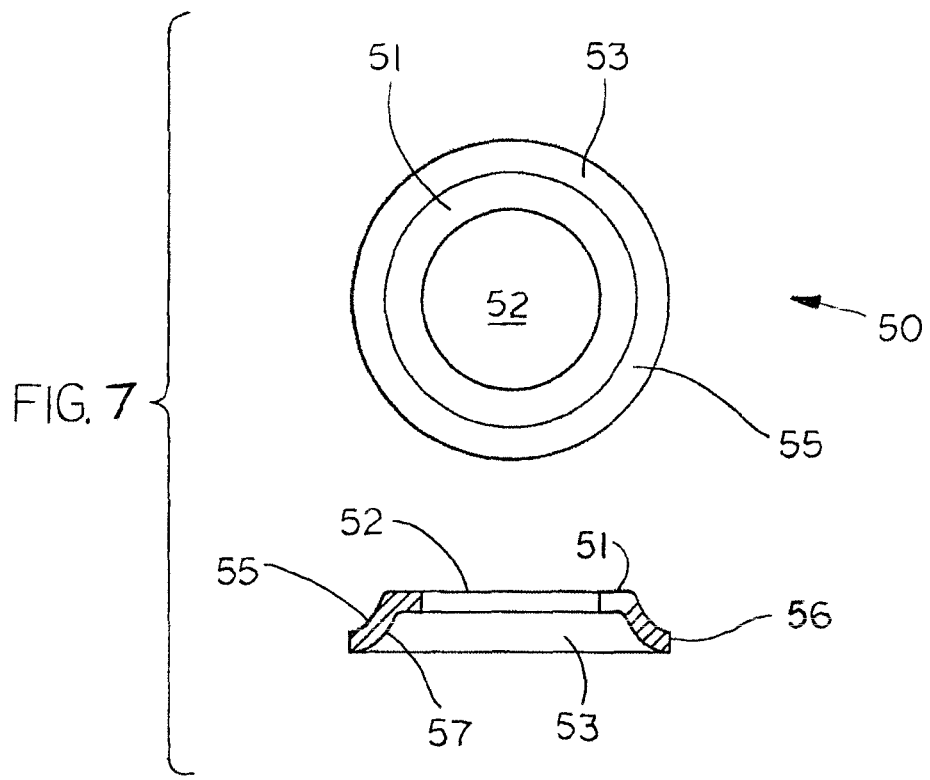
FIG. 7 shows a top view and a cross section of the tension washer.
Figure 8:
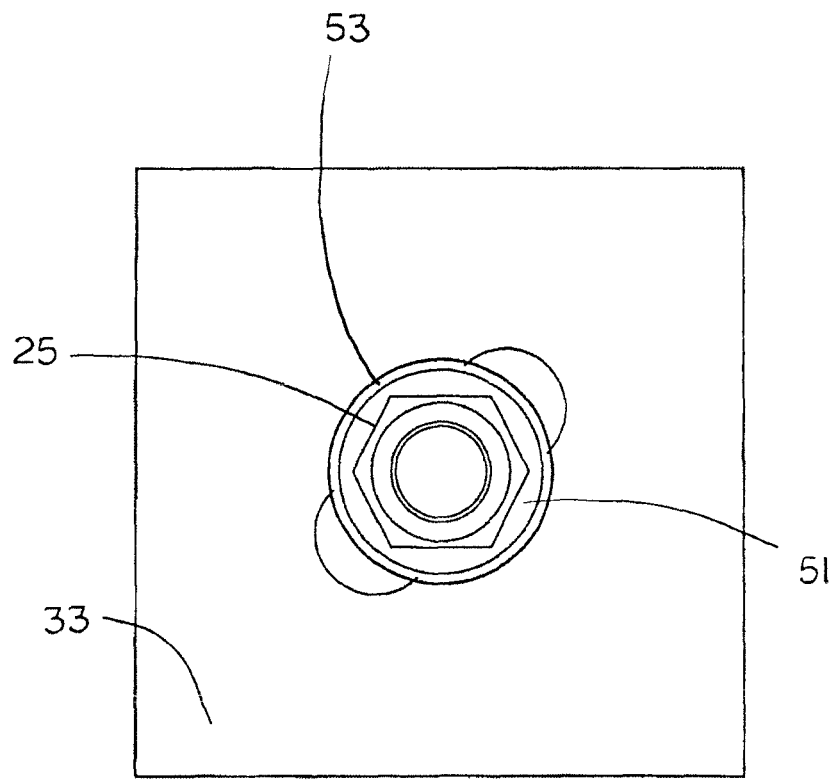
FIG. 8 is a plan view showing the tension washer connected to the flat bearing surface by a hexagonal bolt.
Figure 9:
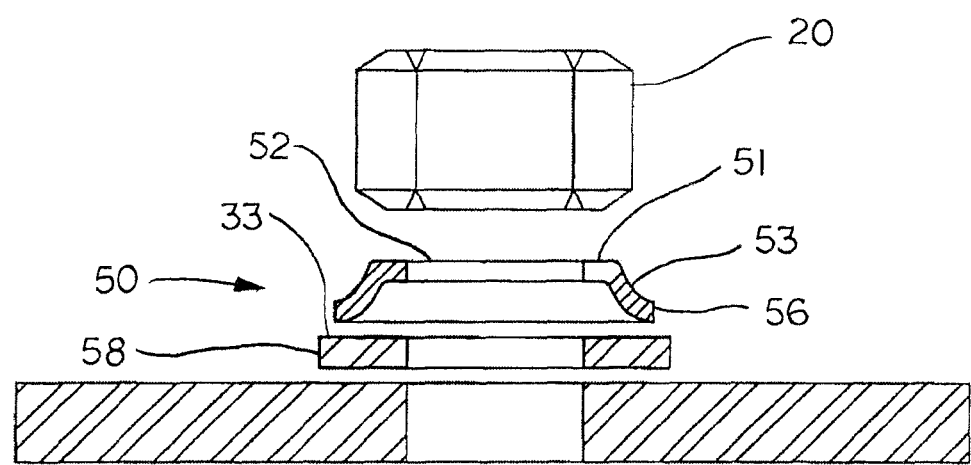
FIG. 9 is a cross section of the tension washer, spacing washer, and flat bearing surface, showing the proximate location of a typical hex bolt head.
Figure 10:
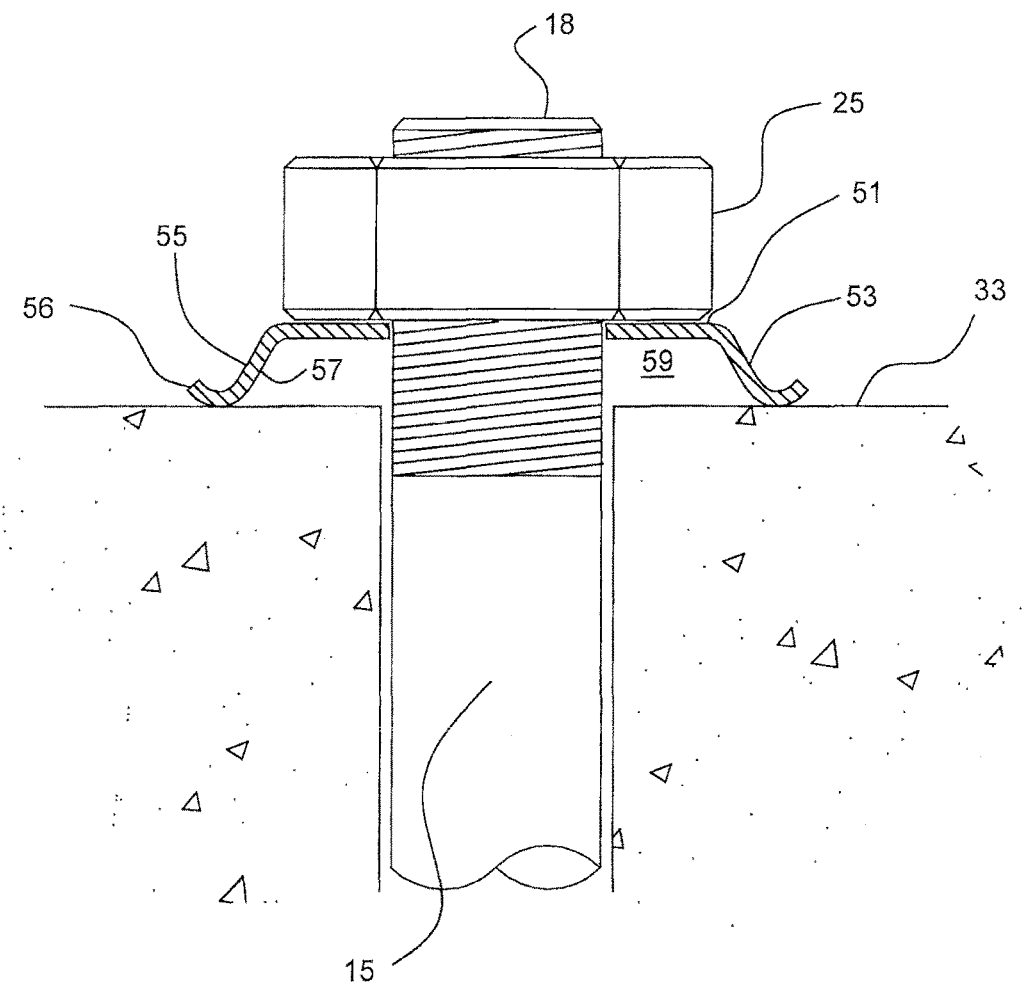
FIG. 10 shows a nut connected to a tension end of a tie member and compressing the tension washer against the flat bearing surface. The tension washer and flat bearing surface are shown in cross section.

Another embodiment of the retaining tie system, shown in FIG. 6, further comprises a bracing member 21 located in the vertical passageway 8. The bracing member 21 is snugly positioned between the inside surface of the blocks of the CMU wall 10 and the surface of the tie member 15. The bracing member 21 is any member that is capable of retaining the tie member 15 in an alignment that passes closely to the centerline of the vertical passageway 8 as the CMU wall 10 bends. In other words, the bracing member 21 is configured to retain the tie member 15 in close proximity to the centerline of the vertical passageway 8. Retaining this alignment prevents the CMU wall 10 from buckling under the compressive force of the tie members 15 when the CMU wall 10 experiences significant bending deflection. The bracing member 21 is one of a variety of materials, such as cured in place foam, pre-cured foam, wood, grout, a bracket, or other such member. In one embodiment, the bracing member 21 is a cured in place foam that is sprayed into the vertical passageway 8. In this embodiment, an access port 39 is installed in one of the blocks in the CMU wall 10, and the foam is sprayed through the access port 39 and into the vertical passageway 8 after the tie member 15 has been fully installed. The access port 39 is then concealed by using a screen member and fill material in a manner similar to that described above for the knock-out 12.

In another embodiment, the bracing member comprises a tubular sleeve configured for vertically receiving the tie member 15. For example, the tubular sleeve could be a segment of PVC pipe placed in the vertical passageway 8 and retained in place by a bonding agent, such as grout, epoxy, a bracket, or the like.

Referring to FIGS. 7-10, a tension washer 50 has a substantially planar body portion 51 defining a central bolt opening 52, and a deformable annular flange member 53 depending from the body 51. The tension washer 50 has a top surface 55, an edge 56, and a bottom surface 57. The deformable annular flange member 53 is curved from its base to the outer edge 56 such that the flange member 53 is concave upward toward the body 51. The bottom surface 27 of the flange member is placed against a flat bearing surface, such as the bearing plate member 33 or a flat washer or spacer 58, so that prior to loading the tension washer 50 the body 51 is separated from the flat bearing surface 33 by a space 59.

A tension end 18 is passed through the opening 52 of the tension washer 50 and tensioned by a socket or a wrench applying torque to a tension adjustment device 25, such as a nut or bolt head. As the tie member 15 is tensioned, such as by tightening the nut 25, the flange member 53 is compressed against the flat bearing surface 33, thereby causing the flange member 53 to expand outwardly by sliding along the flat bearing surface 33. During this action, the flange member 53 deforms by the edge 56 curling upward toward the nut 25 and away from the flat bearing surface 33 (See FIG. 10). Plastic deformation can occur in the outer fibers of the flange member 53 (the fibers along the bottom surface 57), thereby causing unrecoverable deformation and upward curling of the flange member 53. As the flange member 53 slides along the flat bearing surface 33 and curls upward, the body 51 moves toward the flat bearing surface 33, thereby closing the space 59. The flange member 53 thus has an unloaded shape and a first deformed shape.

The tension washer 50 is placed by fitting the central opening 52 over the tension end 18 of the tie member 15. Prior to loading, the annular flange 53 is in its unloaded shape, and the user sees only the top surface 55 without the edge 56 or bottom surface 57 being visible. As the tie member 15 is tensioned and the tension washer 50 is compressed against the flat bearing surface 33, flange member 53 takes on its first deformed shape under a first compression load. In the first deformed shape, the edge 56 becomes visible when the magnitude of the tension force in the tie member 15 reaches a first magnitude. As further tension is applied, the flange member 53 takes on a second deformed shape under a second compression load when the magnitude of the tension force in the tie member 15 reaches a second magnitude, where the first magnitude is lower than the second magnitude. In the second deformed shape, the flange member 53 is severely curved, and the bottom surface 57 under the edge 56 becomes visible to the user. Thus, the edge 56 and the bottom surface 57 provide a two-stage visual indication of tension magnitude in the tie member 15 corresponding to the first deformed shape and the second deformed shape, respectively.

In one embodiment, the top surface 55 of the tension washer 50 is a different color than the edge 56 and bottom surface 57 of the washer 50. For example, the top surface 55 comprises a first color, and the edge 56 and bottom surface 57 comprise a second color. The tension washer 50 is placed on the tension end 18 and against the flat bearing surface 33. Prior to loading, the flange member 53 remains in its unloaded shape, and the user sees only the first color of the top surface 55 without the second color being visible. As the tension washer 50 is loaded, the edge 56 curling action begins, and it continues to the first deformed shape as described above, where the second color of the edge 56 or the bottom surface 57 becomes visible to the user. In this embodiment, the visibility of the second color provides a one-stage visual indicator that a pre-determined magnitude of tension level has been achieved in the tie member 15.

In another embodiment, the top surface 55, edge 56, and bottom surface 57 comprise a first color, a second color, and a third color, respectively. As the tension washer 50 is loaded, the edge 56 curling action continues as described above until the flange member 53 reaches its first deformed shape and the second color of the edge 56 becomes visible, thus indicating a first magnitude of tension force in the tie member 15. As the tie member 15 is tensioned further, the edge 56 curling action continues until the flange member 53 reaches its second deformed shape and the third color of the bottom surface 57 becomes visible to the user, thus providing a visual indication that a second magnitude of tension force has been reached in the tie member 15. The first magnitude is lower than the second magnitude. The visibility of the second color and the third color provides a two-stage visual indicator corresponding to two different magnitudes of tension achieved in the tie member 15—the first magnitude and the second magnitude.

The tension washer 50 is comprised of metal, plastic, or some other material that is capable of deforming properly under the required tension loads. In applications requiring a high tension force, the tension washer 50 comprises a material with a relatively high elastic modulus, such as steel, so that the tension washer 50 does not prematurely deform. In applications requiring lighter tension loads, the tension washer 50 comprises material of a lower elastic modulus, such as die cast metal or plastic, so that the tension washer 50 deforms properly under the lighter load. In another embodiment, proper sizing of the annular flange member 53 is a manner of ensuring that the tension member 50 deforms properly under the required tension load. The thickness of the annular flange member 53 is adjusted according to the required tension load. The annular flange member 53 is either thickened or thinned for larger or smaller tension loads, respectively. Also, the width of the annular flange member 53 can be made wider or more narrow as desired. The width of the flange member 53 affects its elasticity, with narrow flange members 53 being stiffer, and wider flange members 53 being less stiff.

In another embodiment, the edge 56 curls away from the flat bearing surface 33 until the edge 56 contacts the socket or wrench, thereby providing a physical indication to the user that the threaded fastener or mechanical tensioner 20 is properly tensioned.

The tension washer 50 can be used in a method of determining the magnitude of tension in the tension tie member 15 as follows. The tension washer 50 of any of the foregoing embodiments is installed by placing the central opening 52 over the tension end 18 of a tension tie member 15 such that the bottom surface 57 is placed in contact with the flat bearing surface 33. The tension adjustment device 25 is threaded onto the tension end 18 of the tie member 15. The tension adjustment device is adjusted to compress the tension washer 50 against the flat bearing surface 33 such that the annular flange member 53 begins to deform by curling upward toward the body portion 51, thereby causing separation between the edge 56 of the flange member 53 and the flat bearing surface 33. The step of adjusting the tension adjustment device can be stopped when the edge becomes visible to the user, the bottom surface becomes visible to the user, the first color becomes visible to the user, or the second color becomes visible to the user. A first magnitude of tension force in the tie member 15 is identified and reached when the edge 56 becomes visible to the user, or when the first color becomes visible to the user, as described above. Similarly, a second magnitude of tension force in the tie member 15 is identified and reached when the bottom surface 57 or the second color becomes visible to the user.

Figure 11:
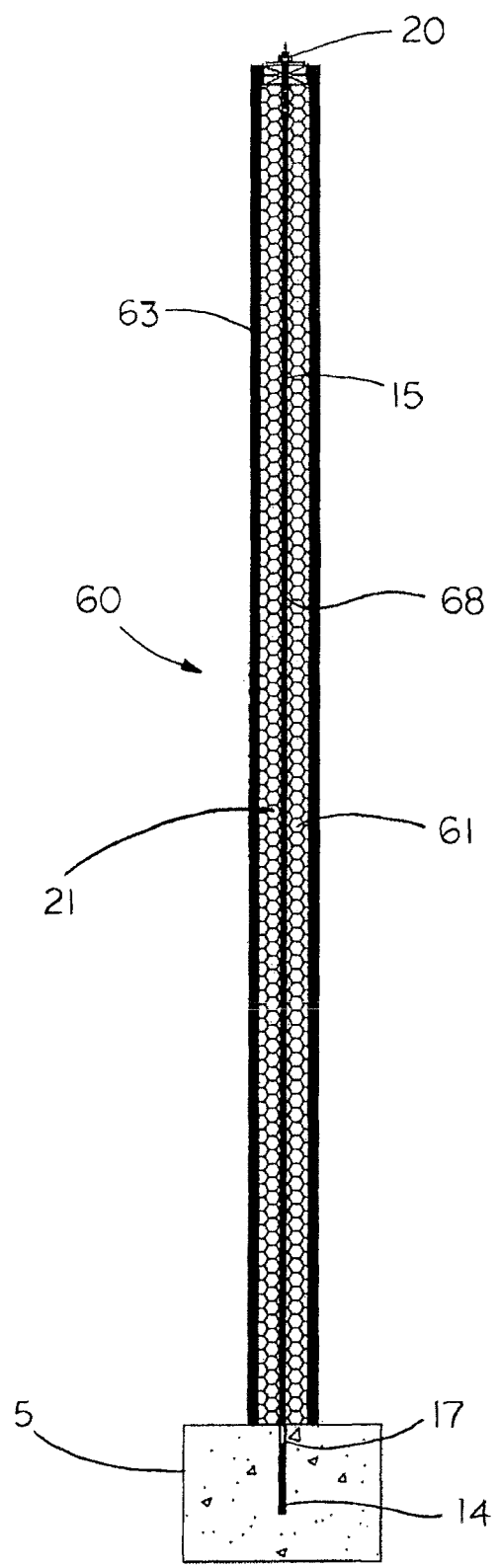
FIG. 11 is a cross section of the retaining tie system installed in a foam core panel wall.
Figure 12:
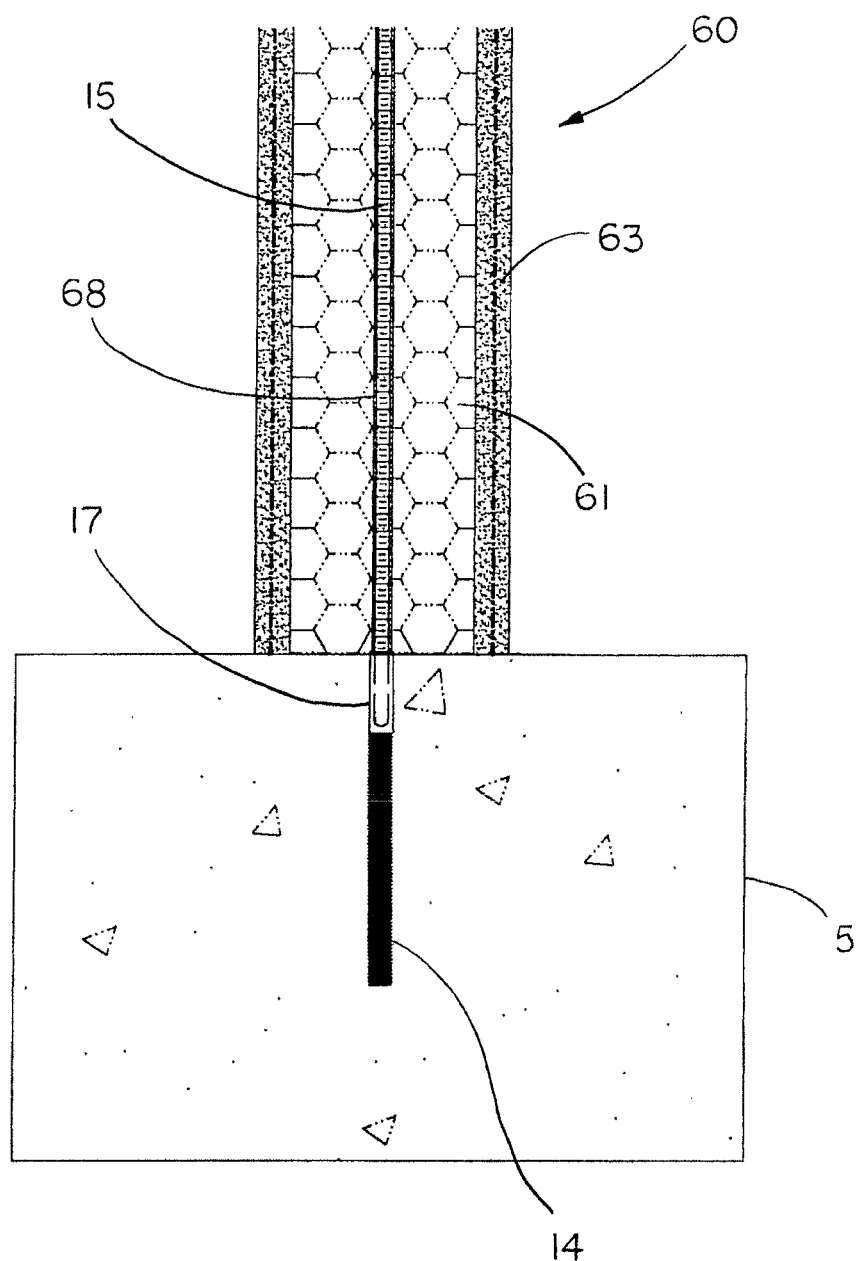
FIG. 12 shows a cross section of the tie member anchorage in a typical foam core panel wall.
Figure 13:
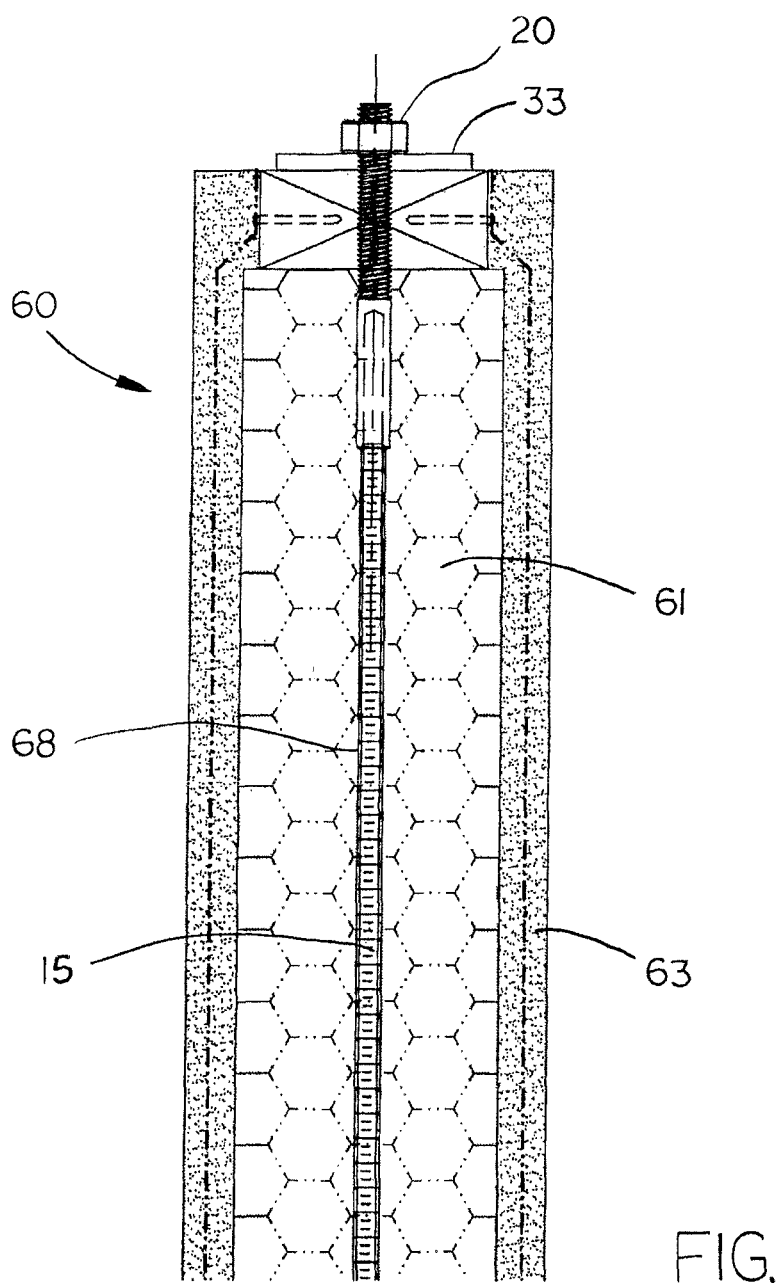
FIG. 13 shows a cross section of the top of a typical foam core panel wall and the mechanical tensioner.

In another embodiment of the retention tie system, shown in FIGS. 11-13, the system is used in connection with insulated concrete panel walls or other composite wall members 60. Composite wall members typically comprise a foam core 61 and a protective cover layer 63 that may or may not contribute to the structural properties of the overall panel wall member 60. In this embodiment, the tie members 15 are installed as described above. However, the vertical passageway 68 may or may not need to be installed. In some embodiments of wall members 60, the foam core 61 has vertical voids that serve as the vertical passageway 68. In other embodiments, the vertical passageway 68 must be installed prior to placement of the tie members 15. In these embodiments, the vertical passageway 68 is installed by drilling or cutting through the foam core 61 to bore out the vertical passageway 68. In other embodiments, the vertical passageway 68 is located at the vertical wall seams between wall members 60 (not shown). For example, the vertical edges of the wall members 60 could be used to sandwich the tie members 15 between them. In another embodiment, the vertical edges of the wall members 60 comprise concave edges that form the vertical passageway 68 when mated with the adjacent wall member 60. In many embodiments, the foam core 61 acts as the bracing member 21, which precludes the need for post-installation of a separate bracing member 21.

Figure 14:
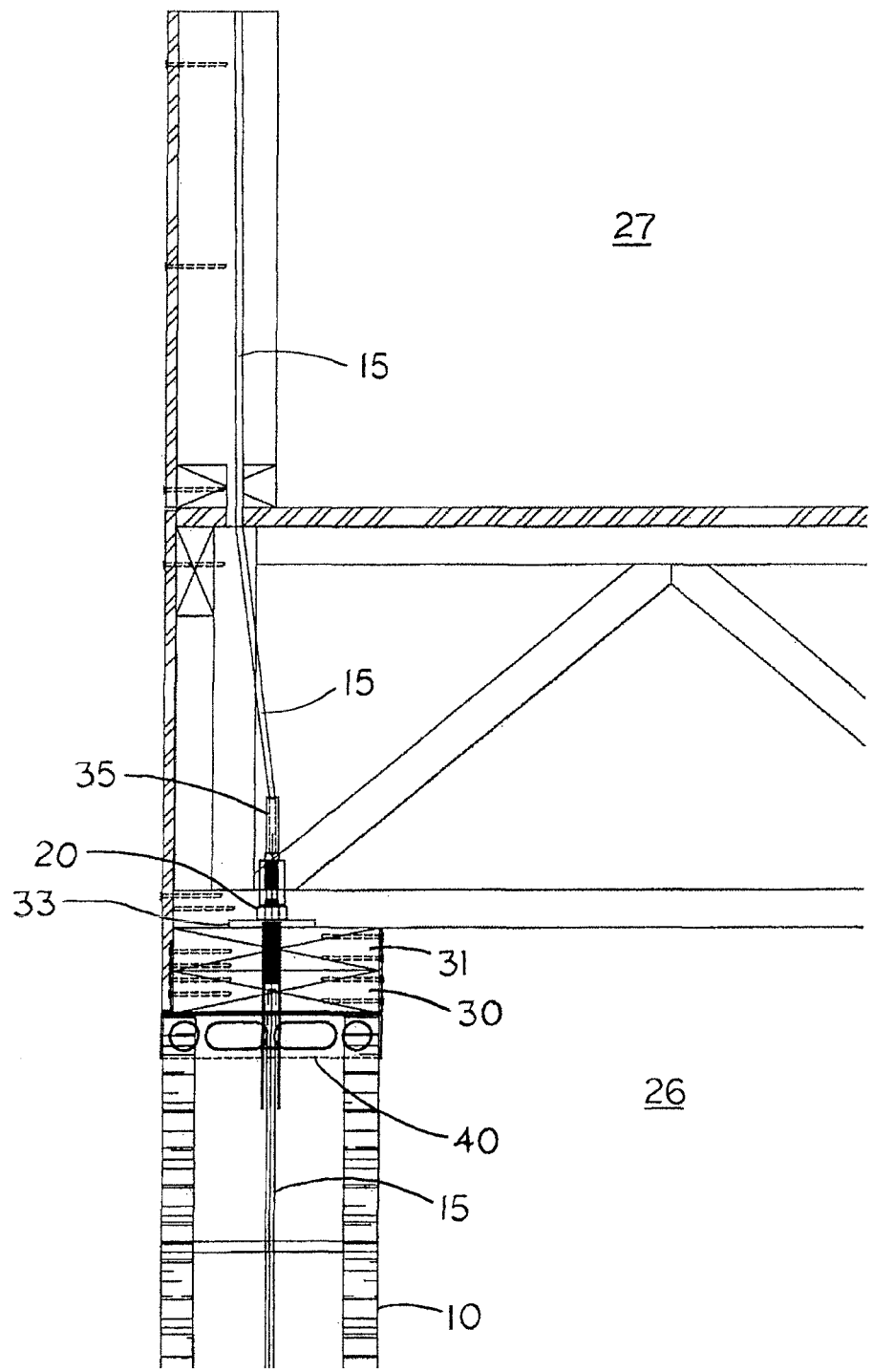
FIG. 14 is a cross section showing the interface between stories of a multiple story building having the retaining tie system installed.
Figure 15:
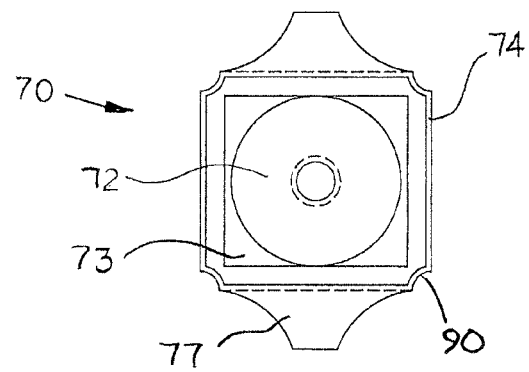
FIG. 15 is a top view of one embodiment of a guide acting as a bracing member.
Figure 16:
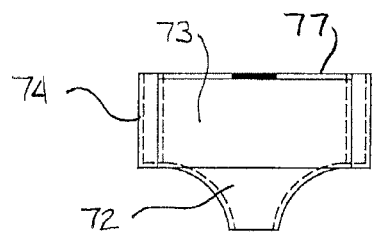
FIG. 16 is a front view of one embodiment of a guide acting as a bracing member.
Figure 17:
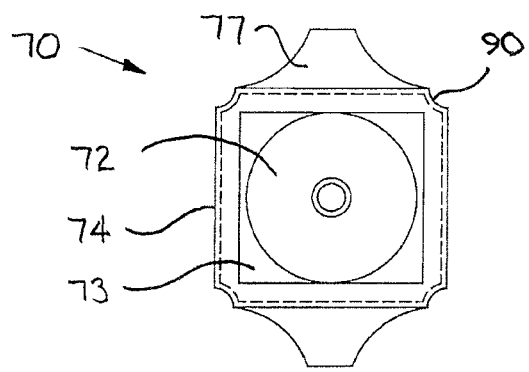
FIG. 17 is a bottom view of one embodiment of a guide acting as a bracing member.
Figure 18:
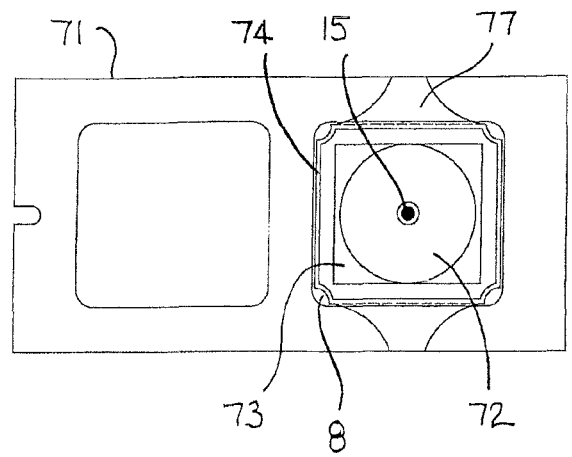
FIG. 18 is a top view of one embodiment of a guide installed in a retainer block.
Figure 19:
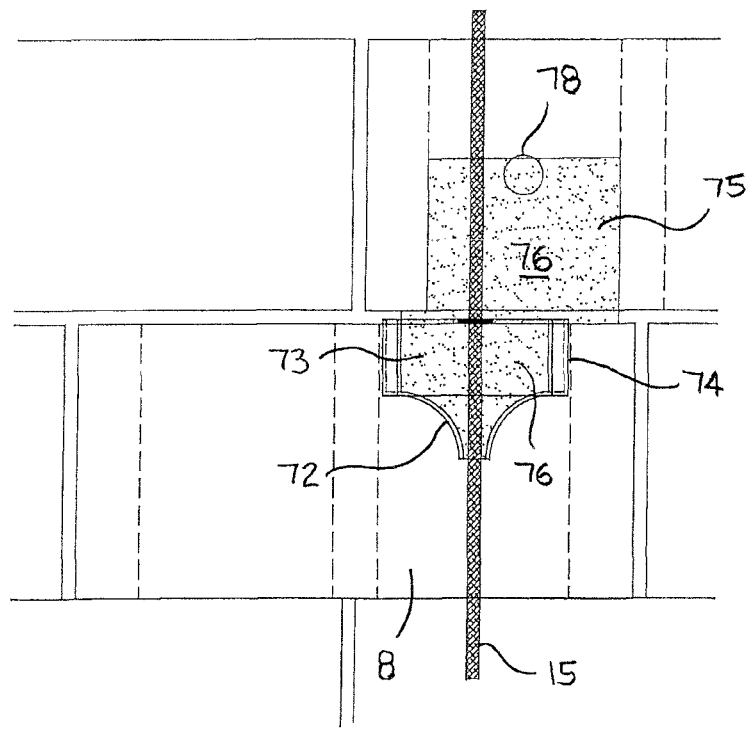
FIG. 19 is a cross section of a portion of a CMU wall having one embodiment of a guide installed as a bracing member.

In any of the foregoing embodiments, the retention tie system can be configured to extend into multistory construction, as shown in FIG. 14. A coupler 35 connects the tie member 15 of the lower story 26 with the tie member 15 of the upper story 27, and the coupler 35 acts as the lower anchor for the tie member 15 of the upper story 27.

Referring to FIGS. 15-19, one form of a bracing member 21 is a guide 70 for collecting the anchor end 17 of a flexible tie member 15 as it is lowered into the vertical passageway 8, as discussed above (See FIGS. 4-6). In one embodiment of the guide 70, shown in FIG. 15, the guide 70 is a funnel-shaped member snugly disposed inside the void of one of the CMU units, which acts as a retainer block 71. In this embodiment, the guide 70 has a funnel 72 disposed below a reservoir 73. The reservoir 73 has vertical walls 74 that form a square- or rectangular-shaped body to snugly seat inside a void of the retainer block 71 in the vertical passageway 8. The walls 74 of the reservoir 73 are tapered such that the guide 70 becomes wedged in the void of the retainer block 71 as the guide 70 is inserted therein. The walls 74 connect at corners at an interface feature 90, which is a joint, seam, edge, or other mechanical or physical construct for joining the walls 74 of the reservoir 73. The interface feature 90 comprises one or more elements to facilitate insertion into the retainer block 71, such elements being a chamfered corner, a filleted corner, a scalloped corner, a notched corner, or the like. The purpose of these elements is to facility insertion of the guide 70 into the retainer block 71 in a manner that minimizes interference between the guide 70 and debris that is internal to the retainer block 71, such debris being excess mortar, grout, or other materials or objects.

The funnel 72 portion of the guide 70 is preferably circular in cross-sectional shape, having a minimum orifice large enough to receive the tie member 15 in a manner where the tie member 15 passes through the minimum orifice with minimal friction resistance. In one embodiment, the guide 70 has lateral wings 77 disposed at the top portion of one or more walls 74. When the guide 70 is installed, these wings are seated on the top of the retainer block 71 to provide additional vertical support to the guide 70 and to prevent the guide 70 from falling down the vertical passageway 8.

Once the anchor end 17 is lowered into and through the guide 70, the anchor end 17 is anchored into the foundation 5 as discussed above. The tie member 15 will then extend from the foundation 5 to the top of the CMU wall 10 in a taut manner. A grout void 75 in the CMU block above the retainer block 71 is then filled with a curable bracing material 76 until the funnel 72, reservoir 73, and grout void 75 are filled with bracing material 76. The bracing material 76 then cures in place. It is preferable, but not required, that the bracing material 76 is a material that is installed in a "wet," or un-cured form, and is curable into a solid form over a short time period after installation. For example, the bracing material 76 could be mortar, grout, self-consolidating grout, epoxy, cement, concrete, foam, cured-in-place foam, or other such material that is installed in its "wet" condition, and then cures in place after installation.

In some applications, it may be desirable to fully tension the tie member 15 prior to installing the bracing material 76. Once the bracing material 76 cures, it provides lateral bracing to the tie member 15, thereby preventing undesired lateral deflection of the tie member 15. In one application, an injection hole 78 is installed in the side of the CMU block in which the void 75 is disposed. Bracing material 76 is injected into the injection hole 78 and enabled to flow down into the funnel 72, reservoir 73, and void 75 until the grout 76 reaches the level of the injection hole 78.

Figure 20:
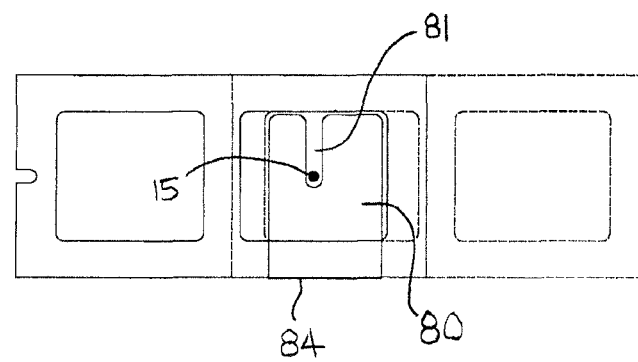
FIG. 20 is a top view of one embodiment of a bracing member shelf installed in a pre-existing CMU wall.
Figure 21:
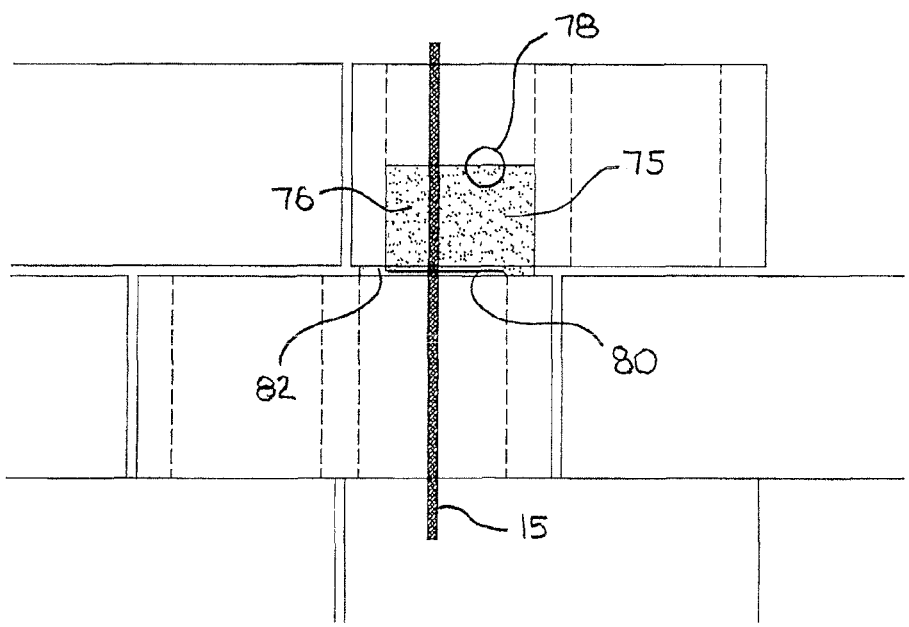
FIG. 21 is a cross section of a portion of a CMU wall having one embodiment of a bracing member shelf installed.
Figure 22:
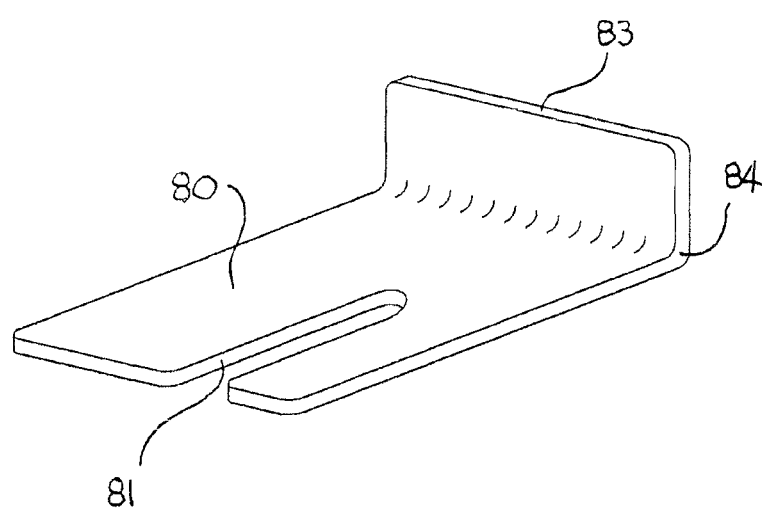
FIG. 22 is an isometric view of one embodiment of a bracing member shelf

In another embodiment of the bracing member 21, shown in FIGS. 20-22, the bracing member 21 comprises a plate-like or wedge-like shelf member 80 having a slot 81 or indentation for receiving the tie member 15. This embodiment of the bracing member 21 is adapted for installation after construction of the wall, such as in post-construction retrofits of CMU walls 10. To install this embodiment of the bracing member 21, a section of horizontal mortar 82 is removed from the existing CMU wall 10. The shelf 80 is inserted into the void left by the removed horizontal mortar 82, and insertion of the shelf 80 is continued until the slot 81 receives the tie member 15. Mortar or grout 76 is then installed through the injection hole 78, as described above, until the void 75 is adequately filled. Once the grout 76 cures, the tie member 15 is laterally braced by the grout 76 as described above.

In one embodiment of the shelf 80, the shelf 80 further comprises a stop 83 attached to a trailing edge 84 of the shelf 80. The stop 83 is a flange, edge, knob, rod, or other member that prevents over penetration of the shelf 80 into the wall. For example, the stop 83 could be a flange along the trailing edge 84 of the shelf 80, where the flange abuts the face of the CMU wall 10 when the shelf 80 is inserted into the CMU wall 10 to an adequate penetration depth.

The foregoing embodiments are merely representative of the retaining tie system and not meant for limitation of the invention. For example, persons skilled in the art would readily appreciate that there are several embodiments and configurations of the retaining tie system members that will not substantially alter the nature of the system. Likewise, elements and features of the disclosed embodiments could be substituted or interchanged with elements and features of other embodiments, as will be appreciated by an ordinary practitioner. Consequently, it is understood that equivalents and substitutions for certain elements and components set forth above are part of the invention described herein.

I claim:

1. An apparatus for reinforcement of masonry walls, the apparatus comprising:
   a tie member having an anchor end and a tension end, the tie member disposed in a vertical passageway in a wall of a structure, the vertical passageway comprising the vertical alignment of voids in a plurality of concrete masonry units; and
   a bracing member disposed in one of the voids in the plurality of concrete masonry units that form the vertical passageway such that the bracing member retains the tie member in close proximity to the centerline of the vertical passageway, the bracing member disposed at an intermediate location between the anchor end and the tension end, the intermediate location being distal from the anchor end and distal from the tension end, the bracing member comprising a downwardly depending funnel connected to a reservoir such that the funnel is disposed below the reservoir, the funnel configured for receiving the tie member, and the reservoir comprising walls disposed in a rectangular orientation, the reservoir configured for receiving and retaining wet cured-in-place bracing material for curing within the reservoir, the bracing material selected from the group consisting of mortar, grout, self-consolidating grout, cured-in-place foam, epoxy, cement, and concrete;

wherein the tie member is laterally supported by the bracing member, and the tie member is laterally unsupported between the bracing member and the anchor end and between the bracing member and the tension end.

2. The system of claim 1, wherein the bracing member disposed at an intermediate location between the anchor end and the tension end distal from the anchor end and distal from the tension end further comprises the bracing member being disposed in proximity to the midpoint of the tie member.

3. The system of claim 1, wherein the walls of the reservoir connect at an interface feature, the interface feature comprising a chamfered corner.

4. The system of claim 1, wherein the walls of the reservoir connect at an interface feature, the interface feature comprising a filleted corner.

5. The system of claim 1, wherein the walls of the reservoir connect at an interface feature, the interface feature comprising a notched corner.

6. The system of claim 1, wherein the walls further comprise a top portion, the reservoir further comprising one or more lateral wings attached to the top portion of one or more walls, the lateral wings protruding from the reservoir at an orientation substantially perpendicular to the vertical passageway.

7. The system of claim 6, wherein the bracing member disposed at an intermediate location between the anchor end and the tension end distal from the anchor end and distal from the tension end further comprises the bracing member being disposed in proximity to the midpoint of the tie member.

8. The system of claim 7, wherein the walls of the reservoir connect at an interface feature, the interface feature comprising a chamfered corner.

9. The system of claim 7, wherein the walls of the reservoir connect at an interface feature, the interface feature comprising a scalloped corner.

10. The system of claim 7, wherein the walls of the reservoir connect at an interface feature, the interface feature comprising a notched corner.

11. A system for reinforcement of concrete masonry unit walls of a structure, the system comprising:

a tie member having an anchor end and a tension end, said tie member disposed in a vertical passageway in a pre-existing, constructed wall of an existing structure, the vertical passageway comprising the vertical alignment of voids in a plurality of concrete masonry units, the wall having a top, and the anchor end configured for embedment into a pre-existing foundation;

a base plate with a first set of access holes, said base plate configured for placement along the top of the wall;

a cover plate with a second set of access holes, the cover plate configured for placement on the base plate at an orientation where the first set of access holes, second set of access holes, and vertical passageway are in substantial vertical alignment;

a bearing plate member having a receiving hole, said bearing plate member configured for placement on the cover plate at an orientation where the receiving hole is placed in substantial vertical alignment with the second set of access holes; and a bracing member disposed in one of the voids in the plurality of concrete masonry units that form the vertical passageway such that the bracing member retains the tie member in close proximity to the centerline of the vertical passageway, the bracing member disposed at an intermediate location between the anchor end and the tension end, the intermediate location being distal from the anchor end and distal from the tension end, the bracing member comprising a funnel connected to a reservoir such that the funnel is disposed below the reservoir, the funnel configured for receiving the tie member, and the reservoir comprising walls disposed in a rectangular orientation, the reservoir configured for receiving wet cured-in-place bracing material for curing within the reservoir; and the bracing material selected from the group consisting of mortar, grout, self-consolidating grout, cured-in-place foam, epoxy, cement, and concrete;

wherein the tie member is laterally supported by the bracing member, and the tie member is laterally unsupported between the bracing member and the anchor end and between the bracing member and the tension end.

12. The system of claim 11, wherein the walls further comprise a top portion, the reservoir further comprising one or more lateral wings attached to the top portion of one or more walls, the lateral wings protruding from the reservoir at an orientation substantially perpendicular to the vertical passageway.

13. The system of claim 12, wherein the bracing member disposed at an intermediate location between the anchor end and the tension end distal from the anchor end and distal from the tension end further comprises the bracing member being disposed in proximity to the midpoint of the tie member.

14. The system of claim 12, wherein the walls of the reservoir connect at an interface feature, the interface feature comprising a filleted corner.

15. The system of claim 12, wherein the walls of the reservoir connect at an interface feature, the interface feature comprising a notched corner.

16. The system of claim 12, wherein the walls of the reservoir connect at an interface feature, the interface feature comprising a filleted corner.

17. The system of claim 11, wherein the bracing member disposed at an intermediate location between the anchor end and the tension end distal from the anchor end and distal from the tension end further comprises the bracing member being disposed in proximity to the midpoint of the tie member.

* * * * *